(12) United States Patent
Todorovic

(10) Patent No.: US 9,328,694 B2
(45) Date of Patent: May 3, 2016

(54) AVIATION GAS TURBINE THRUST REVERSING DEVICE

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 362 days.

(21) Appl. No.: 13/979,782

(22) PCT Filed: Jan. 19, 2012

(86) PCT No.: PCT/EP2012/000240
§ 371 (c)(1),
(2), (4) Date: Aug. 12, 2013

(87) PCT Pub. No.: WO2012/097995
PCT Pub. Date: Jul. 26, 2012

(65) Prior Publication Data
US 2013/0318945 A1 Dec. 5, 2013

(30) Foreign Application Priority Data
Jan. 19, 2011 (DE) .......................... 10 2011 008 917

(51) Int. Cl.
*F02K 1/72* (2006.01)
*F02K 3/02* (2006.01)
(Continued)

(52) U.S. Cl.
CPC . *F02K 3/025* (2013.01); *F02K 1/64* (2013.01);
*F02K 1/70* (2013.01); *F02K 1/72* (2013.01);
*F02K 1/763* (2013.01)

(58) Field of Classification Search
CPC .............. F02K 1/54; F02K 1/64; F02K 1/68;
F02K 1/7072; F02K 1/763; F02K 1/625;
F02K 1/09; F02K 3/025
USPC .................. 60/770, 771, 226.1, 226.2, 226.3;
239/265.11, 265.19, 265.25, 265.31,
239/265.33
See application file for complete search history.

(56) References Cited

U.S. PATENT DOCUMENTS 3,036,431 A 5/1962 Vdolek
3,248,878 A * 5/1966 Clark .................. B64C 29/0025
239/265.25

(Continued)

FOREIGN PATENT DOCUMENTS

DE 1027521 4/1958
DE 2259235 6/1973

(Continued)

OTHER PUBLICATIONS

English translation of International Search Report and Written Opinion from counterpart PCT App No. PCT/EP2012/000240.

(Continued)

*Primary Examiner* — Steven Sutherland
(74) *Attorney, Agent, or Firm* — Timothy J. Klima; Shuttleworth & Ingersoll, PLC

(57) ABSTRACT

The present invention relates to an aircraft gas turbine thrust-reversing device with an engine having an engine cowling, the rear area of which can be displaced in the axial direction of the engine from a closed forward thrust position into a rearwardly displaced thrust reversal position, resulting in an essentially annular free space towards a forward stationary area of the engine cowling, with the rear area of the engine cowling being functionally coupled to deflecting elements arranged in the forward thrust position within the front area of the engine cowling, with the deflecting elements during displacement of the rear area of the engine cowling being moveable on a partial-circular path facing the central axis of the engine and contactable by their rear end areas with a cowling of the core engine.

10 Claims, 6 Drawing Sheets

Figure 1:
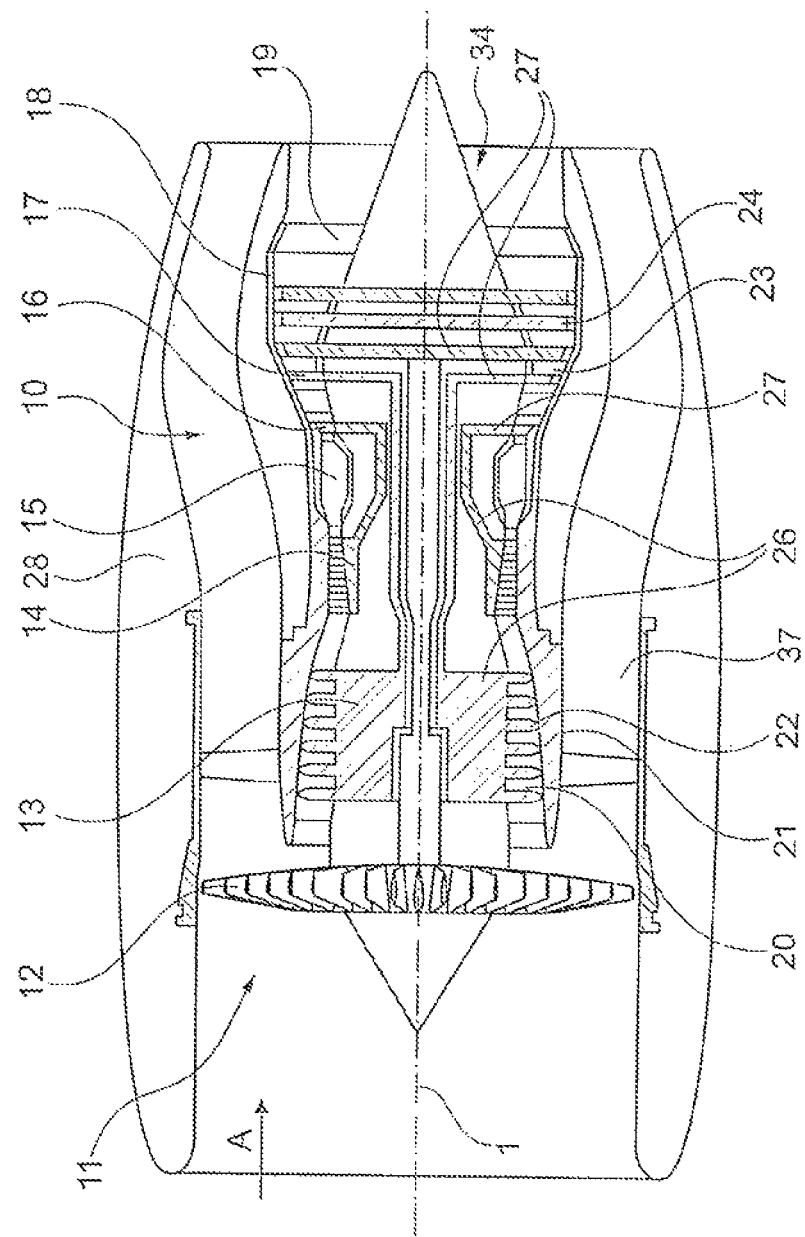

(51) Int. Cl.
  *F02K 1/64* (2006.01)
  *F02K 1/70* (2006.01)
  *F02K 1/76* (2006.01)

(56) References Cited

U.S. PATENT DOCUMENTS

| | | | |
|---|---|---|---|
| 3,280,562 A | | 10/1966 | Theits et al. |
| 3,699,682 A | * | 10/1972 | Kleckner .................. F02K 1/64 60/226.2 |
| 3,824,784 A | * | 7/1974 | Kitson ...................... F02K 1/74 239/265.31 |
| 3,824,785 A | | 7/1974 | Soligny et al. |
| 3,981,451 A | | 9/1976 | Prior et al. |
| 4,716,724 A | | 1/1988 | Newton |
| 4,823,547 A | | 4/1989 | Newton |
| 4,976,466 A | | 12/1990 | Vauchel |
| 5,039,171 A | | 8/1991 | Lore et al. |
| 5,548,954 A | | 8/1996 | De Cambray et al. |
| 5,615,549 A | | 4/1997 | Valleroy |
| 5,778,660 A | | 7/1998 | Jean |
| 6,385,964 B2 | | 5/2002 | Jean et al. |
| 2009/0301056 A1 | | 12/2009 | Hatrick |
| 2010/0270428 A1 | * | 10/2010 | Murphy .................... F02K 1/72 244/110 B |

FOREIGN PATENT DOCUMENTS

| | | |
|---|---|---|
| DE | 3711246 | 10/1987 |
| DE | 3731829 | 5/1988 |
| DE | 68902019 | 12/1992 |
| DE | 69004636 | 5/1994 |
| DE | 69412755 | 3/1999 |
| DE | 69505899 | 4/1999 |
| DE | 69511797 | 8/2001 |
| DE | 60118140 | 11/2006 |
| EP | 1852595 | 11/2007 |

OTHER PUBLICATIONS

International Search Report dated Apr. 19, 2012 from counterpart application.

German Search Report dated Jan. 11, 2012 from counterpart application.

* cited by examiner

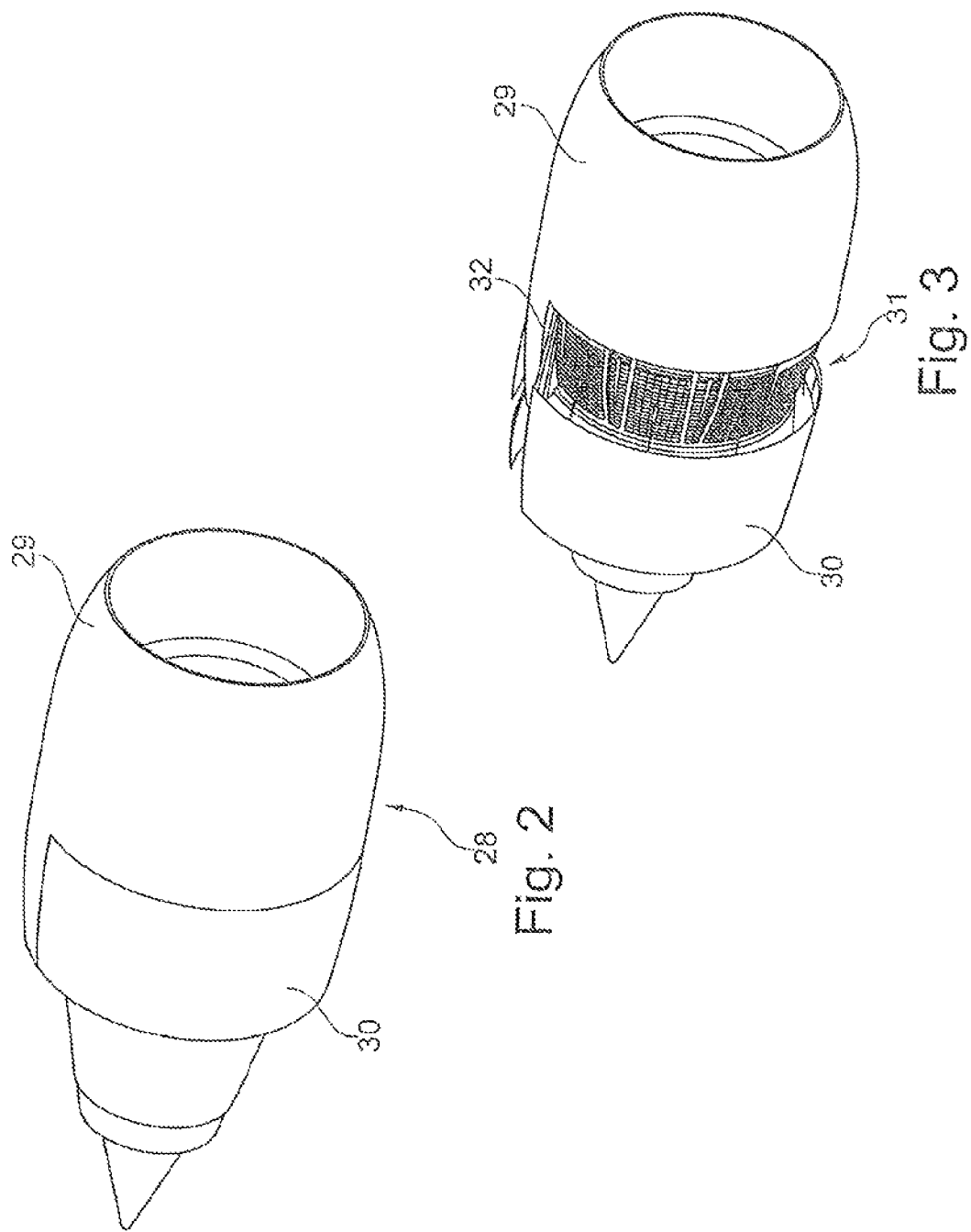

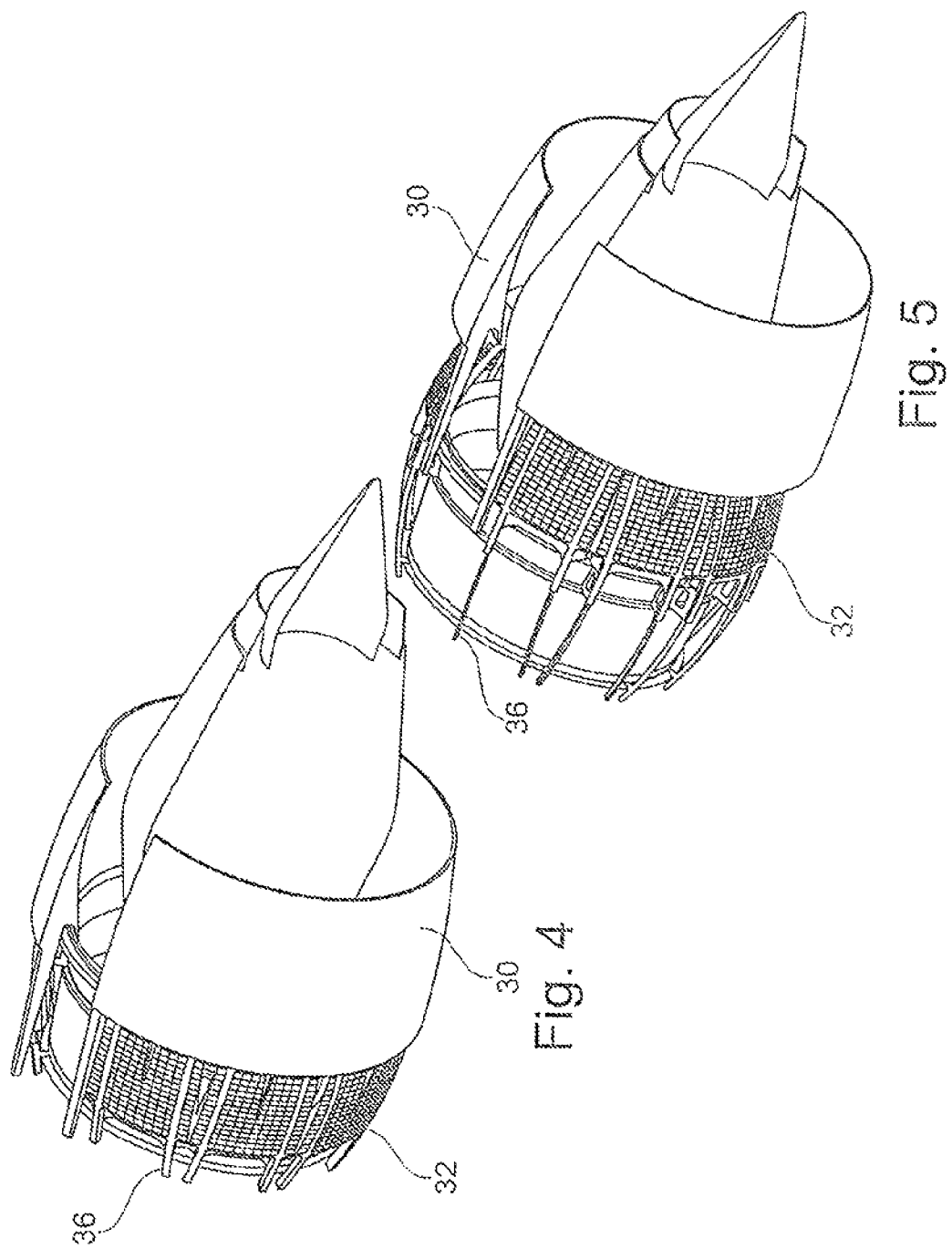

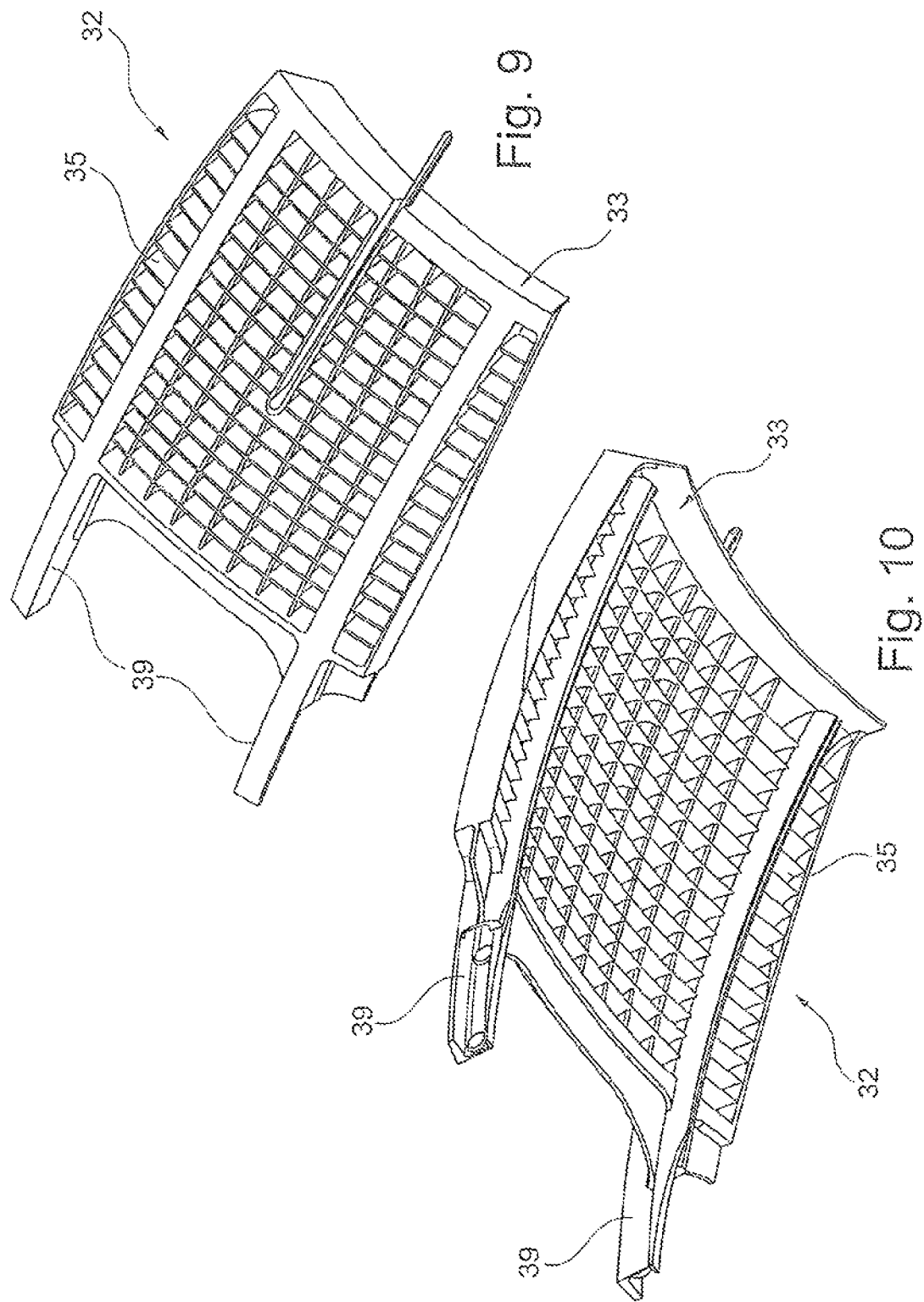

AVIATION GAS TURBINE THRUST REVERSING DEVICE

This application is the National Phase of International Application PCT/EP2012/000240 filed Jan. 19, 2012 which designated the U.S.

This application claims priority to German Patent Application No.DE102011008917.9 filed Jan. 19, 2011, which application is incorporated by reference herein.

This invention relates to an aircraft gas turbine thrust-reversing device with an engine, with an engine cowling and with several variable-position deflecting elements arranged on the circumferential area.

A thrust-reversing device is known from EP 1 852 595 A2 where inside a bypass duct, through which air is passed by a fan, deflecting elements or flow-guiding elements are provided which can be moved from a forward thrust position, in which the flow through the bypass duct can pass unhindered, to a thrust reversal position. It is necessary here to substantially completely close the bypass duct in the thrust reversal position, in order to guide the entire bypass flow through the deflecting elements or flow-guiding elements. In respect of the geometry of the bypass duct and in particular the geometry of the cowling of the core engine, a substantially axial displacement of the thrust-reversing device results either in an adjustment of the geometry of the bypass duct or an incomplete closure of the bypass duct. An adjustment of the geometry of the bypass duct, in particular of the cowling of the core engine, results in drawbacks in the forward thrust position. With incomplete closure of the bypass duct in the thrust reversal position, the thrust-reversing device cannot take optimum effect. The solution known from the state of the art is therefore not optimally usable for all applications and for all engine designs.

US 2009/0301056 A1 shows a design in which the deflecting elements or flow-guiding elements are displaced in a straight line at an angle to the axial axis of the engine. Here too, it is necessary to modify the geometry of the core engine cowling such that a complete flow diversion can be achieved. This leads to disadvantages for performance in forward thrust mode.

It is known from the state of the art that thrust-reversing devices have a lever mechanism inside the bypass duct. This lever mechanism swivels during the transition into the thrust reversal position in order to move deflecting elements into the flow path. It has proven to be a disadvantage here that the lever mechanism and its associated bearings impede the flow through the bypass duct and minimize the efficiency of the aircraft gas turbine. Furthermore, the more difficult access to the core engine results in further drawbacks, in particular during maintenance. In view of the complex structure of the lever mechanism and of the entire thrust-reversing device, the production effort is high, which results in high costs.

The object underlying the present invention is to provide an aircraft gas turbine thrust-reversing device of the type specified at the beginning which, while being simply designed and easily and cost-effectively producible, is characterized by high efficiency and can be used for different geometries of aircraft gas turbines.

It is a particular object of the present invention to provide solution to the above problems by a combination of features described herein. Further advantageous embodiments of the present invention will be apparent from the present description.

It is thus provided in accordance with the invention that the rear area of the engine cowling can be displaced in the axial direction of the engine from a closed forward thrust position into a rearwardly displaced thrust reversal position, resulting in an essentially annular free space towards a forward stationary area of the engine cowling. The free space makes it possible to move deflecting elements into the free space during displacement of the rear area of the engine cowling on a partial-circular path facing the central axis of the engine. Hence the rear area of the engine cowling is moved axially, while at the same time the deflecting elements are moved on an arc-shaped path or a partial-circular path. In accordance with the invention, an arc-shaped or partial-circular path is understood to be a curved or rounded path, also designed with a complex structure, and in any event not straight. Thus the deflecting elements enter the bypass duct and deflect the flow in the bypass duct for thrust reversal.

It is particularly favourable here that the deflecting elements can be brought into contact by their rear end areas with a cowling of the core engine. The deflecting elements thus cause sealing and blocking of the bypass duct. The deflecting elements thus lead due to their height (seen in the radial direction) to sealing and blocking of the bypass duct such that only a relatively small additional blocking element is required.

In accordance with the invention, this provides the possibility of ensuring the thrust reversal function with a few components. The rear area of the engine cowling can be designed in one piece and have a substantially annular shape. This annular shape is only interrupted by a recess necessary to fit the pylon for suspension of the engine.

It is furthermore advantageous that the deflecting elements are moved on an arc-shaped or partial-circular path. It is particularly advantageous here when the deflecting elements are mounted and guided by rail elements. These rail elements can be accommodated in the front area of the engine cowling without hindering the flow through the bypass duct. In the thrust reversal position too, there are no structural elements disrupting the flow in the bypass duct.

A further advantage is achieved in that by a displacement of the rear area of the engine cowling, its leading edge can be brought into contact with the deflecting elements in order to divert the flow in an effective manner for thrust reversal. This blocking of the flow through the bypass duct can be achieved at a place where the radial diameter of the engine cowling of the core engine reaches its maximum extent. This allows the axial movement of the displaceable rear area of the engine cowling to be reduced. This results in accordance with the invention in the possibility of using smaller and lighter actuating and drive mechanisms.

For better sealing or blocking of the flow through the bypass duct, it is particularly favourable when the leading edge of the rear area of the cowling is designed partial-circular or curved, and not straight.

The movement path both of the deflecting elements and of the rear area of the cowling is designed preferably arc-shaped or with a similar complex structure in order to optimize the kinematics and to make effective use of the free space available.

In accordance with the invention, there is thus no hindrance to the flow through the bypass duct in the forward thrust position, so that the efficiency of the aircraft gas turbine is not impaired. In particular, it is not necessary here to alter the geometry of the walls of the bypass duct and adapt it to a thrust-reversing device, as is known from the state of the art.

In accordance with the invention, a plurality of guiding elements is preferably formed on the deflecting element, where the deflecting element overall is preferably designed grid-like. This results in an inherently stable design which is also flow-optimized. This is achieved in particular by a cascade-like embodiment of the deflecting element.

It is also particularly favourable when the individual deflecting elements in the forward thrust position are at a distance from one another in the circumferential direction and are arranged in proximity to one another in the thrust reversal position. This permits an effective contact of the individual deflecting elements in the thrust reversal position, in order to increase the efficiency in said thrust reversal position.

Figure 6:
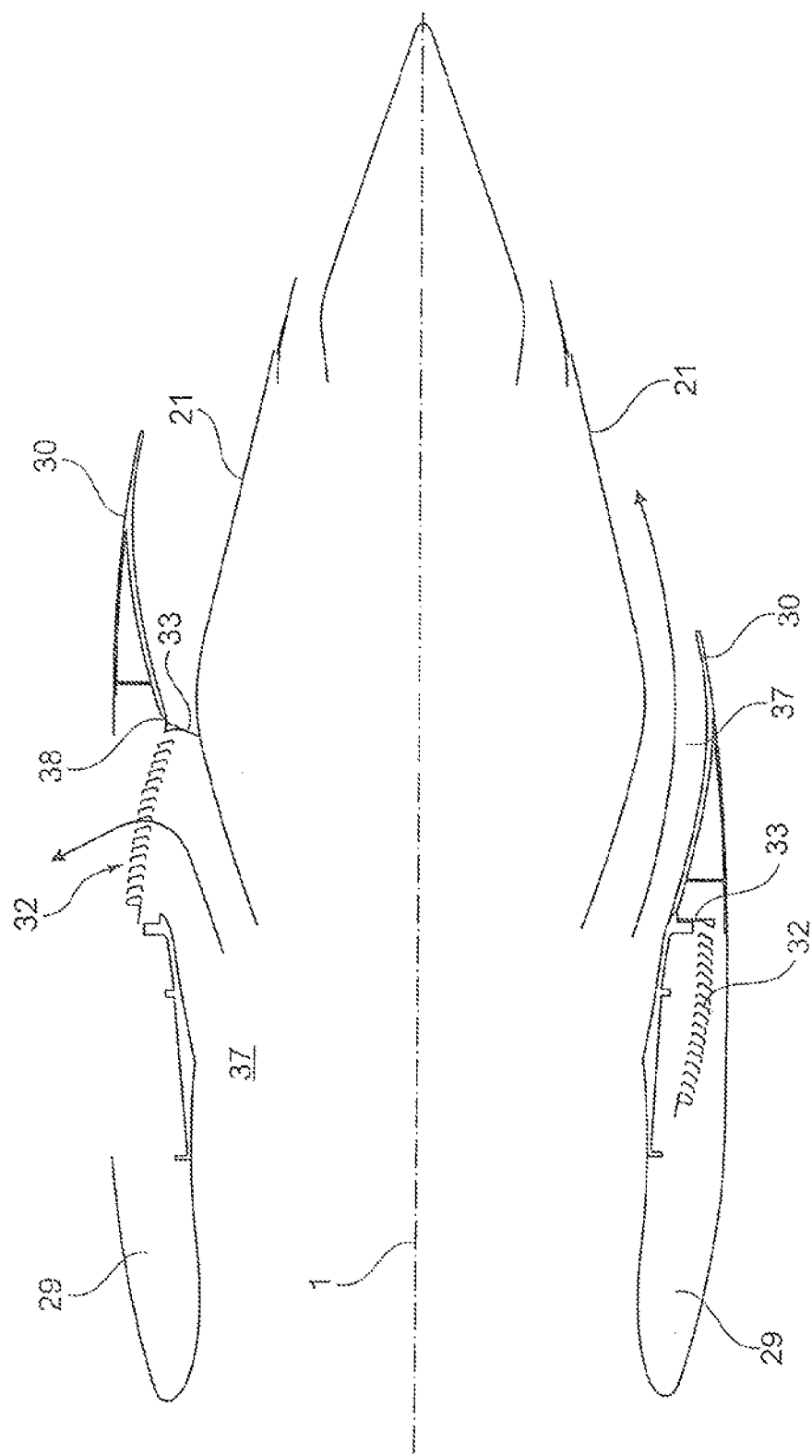
Figure 7:
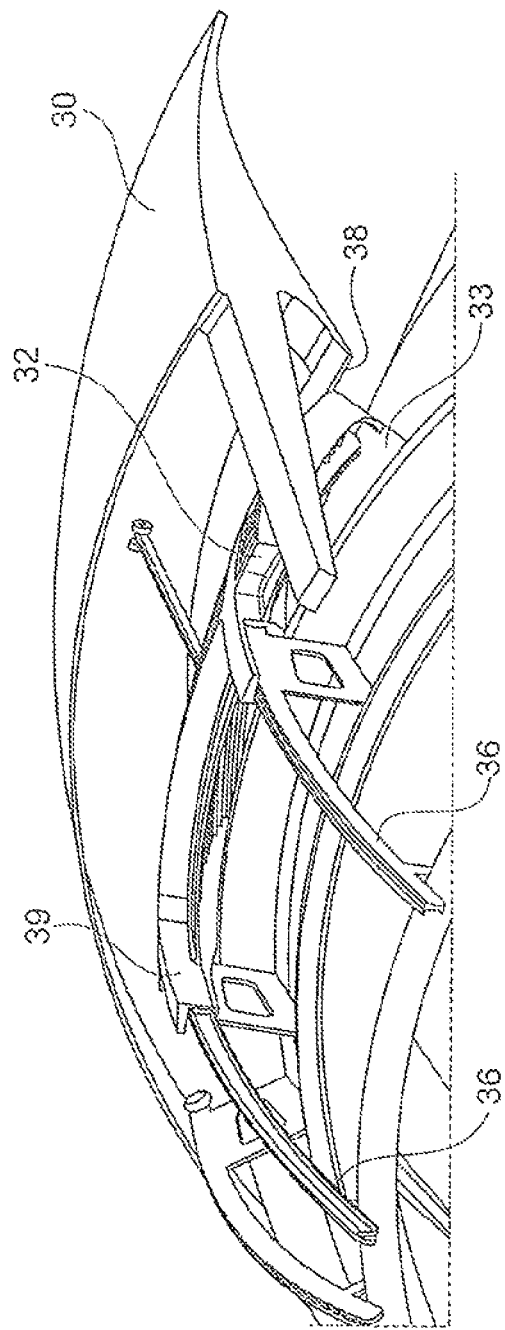
Figure 8:
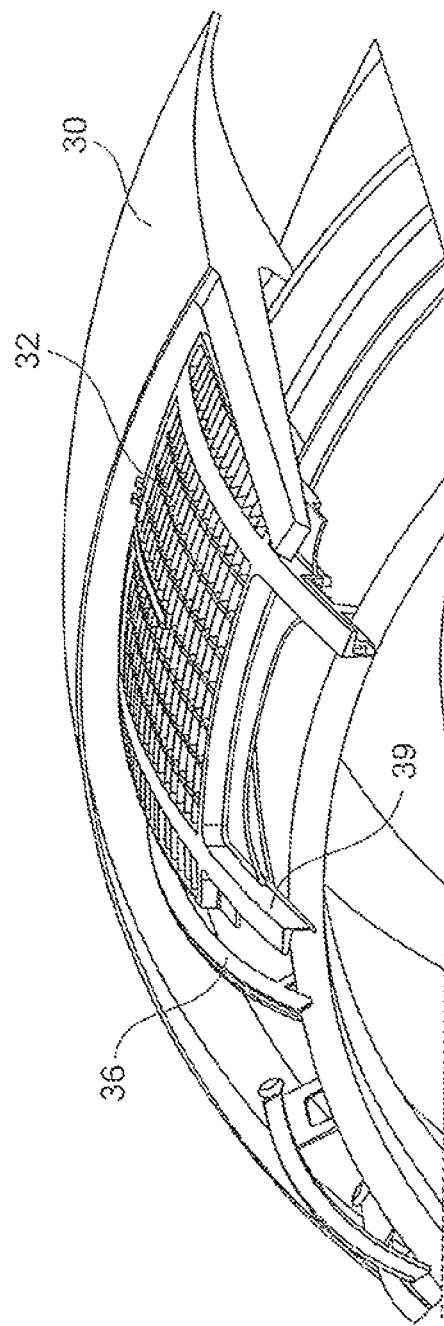

The present invention is described in the following in light of the accompany drawing, showing an exemplary embodiment. In the drawing, FIG. 1 shows a schematic representation of a gas-turbine engine in accordance with the present invention, FIGS. 2, 3 show perspective views of an aircraft gas turbine in accordance with the present invention, obliquely from the front in forward thrust position and thrust reversal position, respectively, FIGS. 4, 5 show perspective views obliquely from the rear onto the aircraft gas turbine in accordance with FIGS. 2 and 3 in the forward thrust position and thrust reversal position, respectively, FIG. 6 shows a schematic partial sectional view to illustrate the functioning of the thrust-reversing device in accordance with the present invention, FIG. 7 shows a perspective partial view of the exemplary embodiment in accordance with the present invention in thrust reversal position, FIG. 8 shows a perspective view, by analogy with FIG. 7, in forward thrust position, and FIGS. 9, 10 show perspective views of the deflecting element in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 1 furthermore shows a cowling 26 of a bypass duct 37 as well as with reference numeral 34 the already explained structure of the core engine.

FIGS. 2 to 5 each show perspective representations of the aircraft gas turbine in accordance with the invention with thrust-reversing device. FIG. 2 shows a forward thrust position in a view obliquely from the front, in which the cowling 28 is closed to permit an undisturbed flow through the bypass duct. This state is also shown schematically in the lower half of FIG. 6. It can be discerned here in particular that a front area 29, which remains stationary, of the cowling 28 forms the first part of the limitation of the bypass duct 37, while a rear area 30 of the cowling 28 can be displaced in the axial direction. This can be inferred from a comparison of the upper half of the figure with the lower half of the figure (see FIG. 6). FIG. 2 thus shows the forward thrust position, while FIG. 3 shows the thrust reversal position in which the rear area 30 of the cowling 28 is axially displaced. This results in a free annular space 31 which is interrupted only by the area of a pylon, not illustrated in detail, for suspending the aircraft gas turbine.

FIGS. 4 and 5 show in a rear perspective and oblique view the representation in FIGS. 2 and 3, with an illustration of the front area 29 of the cowling 28 being dispensed with to afford a better view of the deflecting elements 32. In FIG. 4 (forward thrust position) it can be seen that the deflecting elements 32 are arranged inside the cowling of the bypass duct 37 such that a flow through the bypass duct 37 is not hindered (lower half of FIG. 6). In the case of an axial displacement of the rear area 30 of the cowling 28 (see FIG. 5) into the thrust reversal position, the individual deflecting elements 32 are moved rearwards and inwards on an arc-shaped path. A comparison of FIGS. 4 and 5 shows that the deflecting elements 32 are at a distance from one another in the forward thrust position. In the thrust reversal position (FIG. 5), the deflecting elements 32 are brought closer to one another in the circumferential direction, so that the gap formed by the distance (FIG. 4) closes and the deflecting elements 32 are in contact with one another at their rear edge, as is shown in FIG. 3 too.

In the description, the terms "front" and "rear" refer to the flow direction through the aircraft gas turbine, with "front" corresponding to the inlet area and "rear" to the outlet area.

FIG. 6 shows that the deflecting elements 32 include at their rear end area a radially inward facing blocking element 33 which in the thrust reversal position (upper half of FIG. 6) contacts the cowling 21 of the core engine 34. The rear area 30 of the cowling 28 has at its front end a leading edge 38 which, in the thrust reversal position (upper half of FIG. 6), contacts the rear end area of the deflecting elements 32 and leads to a complete closure of the bypass duct 37 in the axial rear direction.

As shown in FIGS. 9 and 10, the deflecting elements 32 are designed grid-like or cascade-like and include a plurality of guiding elements 35 designed for an optimized flow.

FIGS. 7 to 10 furthermore show rail elements 36 designed as telescopic rails on which the deflecting elements 32 are mounted. The rail elements 36 are designed as partial arcs and matching the rail elements 39 of the deflecting elements 32, so that the deflecting elements 32 are stably and precisely mounted in a simple manner.

The deflecting elements 32 can for example be produced as castings or as composite parts.

With the embodiment in accordance with the invention, tensile forces are created in the thrust reversal position which act on the deflecting elements 32 and fix them in the thrust reversal position. Furthermore, a radial force component results, which contributes to a sealing contact of the blocking elements 33 with the cowling 31. When the individual webs of the cascade-like deflecting element 32 are considered, the result with regard to the forces acting during the flow is that a force component acting radially inwards is also created, which effects the inward pressure as described above of the deflecting elements 32 in the radial direction and hence the sealing contact of the blocking elements 33. This effect is further strengthened by the flow acting on the blocking elements 33 when the flow is deflected, as can be seen from the upper portion of FIG. 6.

LIST OF REFERENCE NUMERALS

1 Engine axis/central axis
10 Gas-turbine engine
11 Air inlet
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing/cowling
22 Compressor rotor blades
23 Stator vanes
24 Turbine blades
26 Compressor drum or disk
27 Turbine rotor hub
28 Cowling (nacelle)
29 Front area of cowling
30 Rear area of cowling
31 Free annular space
32 Deflecting element (cascade)
33 Blocking element
34 Core engine
35 Guiding element
36 Rail element
37 Bypass duct
38 Leading edge
39 Rail element

What is claimed is:

1. An aircraft gas turbine thrust-reversing device, comprising:
   an engine cowling of a gas-turbine engine, the engine cowling including a front area and a rear area, the rear area being displaceable in an axial direction of the gas-turbine engine between a closed forward thrust position and a rearwardly displaced thrust reversal position, wherein, when the rear area is in the rearwardly displaced thrust reversal position, an annular free space is opened between the rear area and the front area;
   a plurality of deflecting elements positioned circumferentially around the gas-turbine engine and being coupled to the rear area to move axially along the gas-turbine engine with the rear area, wherein, in the closed forward thrust position, the plurality of deflecting elements are positioned within the front area,
   telescoping rail elements, each including a partial circular arc shape with a concave side facing toward an interior of the gas-turbine engine, and each mounting and guiding one of the plurality of deflecting elements along the partial circular arc shape between the closed forward thrust position and the rearwardly displaced thrust reversal position;
   wherein, during displacement of the rear area from the closed forward thrust position to the rearwardly displaced thrust reversal position, each of the plurality of deflecting elements is displaced by the rear area to move along the partial circular arc shape until a rear end area of each of the plurality of deflecting elements is in contact with a cowling of a core engine of the gas-turbine engine.

2. The aircraft gas turbine thrust-reversing device in accordance with claim 1, wherein at least one of the plurality of deflecting elements includes a plurality of guiding elements.

3. The aircraft gas turbine thrust-reversing device in accordance with claim 1, wherein at least one of the plurality of deflecting elements includes a grid shape.

4. The aircraft gas turbine thrust-reversing device in accordance with claim 1, wherein at least one of the plurality of deflecting elements includes a cascade shape.

5. The aircraft gas turbine thrust-reversing device in accordance with claim 1, wherein at least one of the plurality of deflecting elements includes a blocking element positioned at the rear end area, which in the rearwardly displaced thrust reversal position, is movable into sealing contact with the cowling of the core engine.

6. The aircraft gas turbine thrust-reversing device in accordance with claim 5, wherein the rear end areas of adjacent ones of the plurality of deflecting elements in the closed forward thrust position are positioned at a first distance from one another in a circumferential direction, and in the rearwardly displaced thrust reversal position, the rear end areas of the adjacent ones of the plurality of deflecting elements are arranged at a second distance to one another in the circumferential direction, with the second distance being smaller than the first distance.

7. The aircraft gas turbine thrust-reversing device in accordance with claim 6, wherein the plurality of deflecting elements in the rearwardly displaced thrust reversal position are arranged at an angle to a central axis of the gas-turbine engine.

8. The aircraft gas turbine thrust-reversing device in accordance with claim 1, wherein the rear end areas of adjacent ones of the plurality of deflecting elements in the closed forward thrust position are positioned at a first distance from one another in a circumferential direction, and in the rearwardly displaced thrust reversal position, the rear end areas of the adjacent ones of the plurality of deflecting elements are arranged at a second distance to one another in the circumferential direction, with the second distance being smaller than the first distance.

9. The aircraft gas turbine thrust-reversing device in accordance with claim 8, wherein the plurality of deflecting elements in the rearwardly displaced thrust reversal position are arranged at an angle to a central axis of the gas-turbine engine.

10. The aircraft gas turbine thrust-reversing device in accordance with claim 1, wherein the plurality of deflecting elements in the rearwardly displaced thrust reversal position are arranged at an angle to a central axis of the gas-turbine engine.

* * * * *